(12) United States Patent
Ding et al.

(10) Patent No.: US 8,812,426 B2
(45) Date of Patent: *Aug. 19, 2014

(54) SELECTING SOLUTION FOR CARBON EMISSION PREDICTION

(75) Inventors: Hong Wei Ding, Beijing (CN); Jin Dong, Beijing (CN); Minmin Qiu, Beijing (CN); Hao Wang, Beijing (CN); Xiao Qing Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 223 days.

This patent is subject to a terminal disclaimer.

(21) Appl. No.: 13/456,284

(22) Filed: Apr. 26, 2012

(65) Prior Publication Data

US 2012/0278270 A1    Nov. 1, 2012

(30) Foreign Application Priority Data

Apr. 28, 2011  (CN) .......................... 2011 1 0116050

(51) Int. Cl.
*G06F 17/00* (2006.01)
*G06N 5/02* (2006.01)

(52) U.S. Cl.
USPC ........................................... 706/48

(58) Field of Classification Search
USPC ........................................... 706/48
See application file for complete search history.

(56) References Cited

U.S. PATENT DOCUMENTS

| | | | |
|---|---|---|---|
| 7,421,348 B2 * | 9/2008 | Swanson | ........................ 702/32 |
| 2009/0307037 A1 | 12/2009 | King | |
| 2010/0070404 A1 | 3/2010 | McConnell et al. | |
| 2010/0211518 A1 | 8/2010 | Ohnemus et al. | |

\* cited by examiner

*Primary Examiner* — Kakali Chaki
*Assistant Examiner* — Ababacar Seck
(74) *Attorney, Agent, or Firm* — Jeff Tang

(57) ABSTRACT

A computer-implemented method and non-transitory article of manufacture tangibly embodying computer readable instructions for selecting a solution for carbon emission prediction. The method includes the steps of: obtaining historical records of carbon emission and a current demand for carbon emission, locating from the historical records of carbon emission a best matching historical record with respect to the current demand, selecting, based on the located best matching historical record, one of (i) a data prediction solution record and (ii) a rule prediction solution, and calculating a demand gap between the current demand and the best matching historical record as a best matching demand gap, where at least one step is carried out using a computer device.

9 Claims, 8 Drawing Sheets

SELECTING SOLUTION FOR CARBON EMISSION PREDICTION

CROSS-REFERENCE TO RELATED APPLICATION

This application claims priority under 35 U.S.C. §119 from Chinese Patent Application No. 201110116050.2 filed Apr. 28, 2011, the entire contents of which are incorporated herein by reference.

BACKGROUND

1. Field of the Invention

Embodiments of the present invention generally relate to the field of information technology, and more specifically, to a method, apparatus, and system for selecting a solution for carbon emission prediction.

2. Related Art

As the energy and environmental issue gets increasingly tough, carbon emission has received more and more attention. Carbon emission is a general term or short for greenhouse gas emission. Since excessive carbon emissions will exert an adverse or even irreversible impact on the environment, the control of carbon emissions is one of important issues confronting modern production, manufacture, logistics, and other aspects.

After a demand with respect to a specific production or transport project is determined and before the project is put into actual operation, in addition to predicting and evaluating the key performance index (KPI), it is expected to predict carbon emissions as precisely as possible so as to adjust the plan or scheme of the protect according to the prediction and further reduce carbon emissions for satisfying rules and regulations, international standards, etc. In the context of the disclosure, term "demand" refers to any carbon emissions-related requirement, provision, standard or other aspect in production, manufacture, transport and other projects, including but not limited to amount of coal used, amount of power used, amount of fuel used, amount of natural gas used, storage area (e.g., warehouse area), amount of machine used, moving distance of machine, heating time, lighting time, and so on.

There exist several solutions for predicting carbon emission, including but not limited to IPCC (the Intergovernmental Panel on Climate Change) Guideline, GHG (the Greenhouse Effect) Protocol Initiative, PAS2050, and so on. Generally speaking, existing solutions for carbon emission prediction can be divided into two types, namely data-based prediction solutions (referred to as "data prediction solutions" for short) and non-data-based prediction solutions (referred to as "rule prediction solutions" for short). In a data prediction solution, a demand is quantized, and various value operations are performed on quantized values to obtain a result of carbon emission prediction. By contrast, in a non-data-based prediction solution a result of carbon emissions prediction is obtained based on a series of rules and logical judgment. It should be noted that the "non-data-based prediction solution" and "rule prediction solution" can be used interchangeably in the context of the disclosure.

After a project is put into practice, actual measurements of carbon emission can be measured by various means. Subsequently, a prediction precision can be obtained by comparing the actual measurements of carbon emission with the prediction result. As known in the art, data prediction and rule prediction can have different precisions for different demands. It is to be understood that for some demands, a data prediction solution obtains a more approximate prediction result to actual measurements than a rule prediction solution, while for other demands, a rule prediction solution obtains a more approximate prediction result to actual measurements than data prediction. In other words, precisions of these two types of solutions for carbon emission prediction are related to demands.

SUMMARY OF THE INVENTION

One aspect of the invention includes a computer-implemented method for selecting a solution for carbon emission prediction. The method includes the steps of: obtaining historical records of carbon emission and a current demand for carbon emission, locating from the historical records of carbon emission a best matching historical record with respect to the current demand, selecting, based on the located best matching historical record, one of (i) a data prediction solution record and (ii) a rule prediction solution, and calculating a demand gap between the current demand and the best matching historical record as a best matching demand gap, where at least one step is carried out using a computer device Yet another aspect of the invention includes a non-transitory article of manufacture tangibly embodying computer readable instructions which, when implemented, cause a computer device to carry out the steps of a method including: obtaining historical records of carbon emission and a current demand for carbon emission; locating from the historical records of carbon emission a best matching historical record with respect to the current demand; selecting, based on the located best matching historical record, one of: (i) a data prediction solution record and (ii) a rule prediction solution; and calculating a demand gap between the current demand and the best matching historical record as a best matching demand gap.

BRIEF DESCRIPTION OF THE DRAWINGS

The above and other objects, features, and advantages of embodiments of the present invention will become easier to understand from the following detailed description with reference to the figures. In the figures, several embodiments of the present invention are illustrated by way of illustration instead of limitation, where.

DETAILED DESCRIPTION OF THE INVENTION

Figure 1:
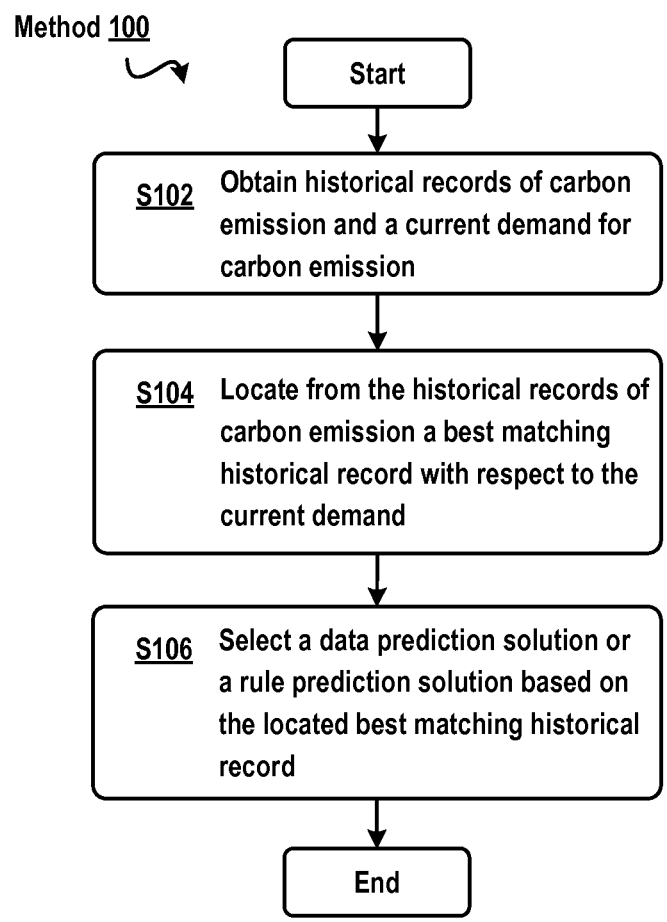
FIG. 1 illustrates a flowchart of a method 100 for selecting a solution for carbon emission prediction according to one embodiment of the present invention.

Although there exist two types of solutions for carbon emission prediction as described above, in the prior art it is usually impossible to determine in advance whether a data prediction solution or a rule prediction solution can be used for achieving a more accurate prediction result (i.e., more approximate to an actual measurement to be obtained subsequently) for a given demand. In view of this, embodiments of the present invention provide a method, apparatus, and system for selecting a solution for carbon emission prediction.

In an aspect of the present invention, there is provided a method for selecting a solution for carbon emission prediction. The method includes: obtaining historical records of carbon emission and a current demand for carbon emission, locating from the historical records of carbon emission a best matching historical record with respect to the current demand, and selecting one of a data prediction solution and a rule prediction solution based on the located best matching historical record for carbon emission prediction for the current demand.

According to some embodiments of the present invention, a demand gap between the current demand and the best matching historical record is calculated as a best matching demand gap, where the selecting one of a data prediction solution and a rule prediction solution further includes: determining a data prediction precision as a function of the demand gap, determining a rule prediction precision, and selecting one of a data prediction solution and a rule prediction solution according to the best matching demand gap, the data prediction precision, and the rule prediction precision.

According to some embodiments of the present invention, the determining a data prediction precision includes: determining an upper limit and a lower limit of the data prediction precision. The determining a rule prediction precision includes: determining an upper limit and a lower limit of the rule prediction precision. The selecting one of a data prediction solution and a rule prediction solution includes: determining a first demand gap corresponding to the case that the lower limit of the data prediction precision is equal to the upper limit of the rule prediction precision, determining a second demand gap corresponding to the case that the upper limit of the data prediction precision is equal to the lower limit of the rule prediction precision, and selecting one of a data prediction solution and a rule prediction solution based on the best matching demand gap, the first demand gap, and the second demand gap.

In particular, according to some embodiments of the present invention, the selecting one of a data prediction solution and a rule prediction solution further includes: selecting a data prediction solution responsive to the best matching demand gap being less than the first demand gap, selecting a rule prediction solution responsive to the best matching demand gap being larger than the second demand gap, and responsive to the best matching demand gap falling between the first demand gap and the second demand gap, selecting one of a data prediction solution and a rule prediction solution based on an actual carbon emission measurement, a rule prediction result, and a data prediction result associated with the best matching historical record.

According to some embodiments of the present invention, the method can further include: storing in the historical records the current demand and an actual carbon emission measurement for the current demand. The method can further include: storing the best matching demand gap, a prediction result and a prediction precision for the demand.

In another aspect of the present invention, there is provided an apparatus for selecting a solution for carbon emission prediction. The apparatus includes: obtaining means configured to obtain historical records of carbon emission and a current demand for carbon emission, record locating means configured to locate from the historical records of carbon emission a best matching historical record with respect to the current demand, and selecting means configured to select one of a data prediction solution and a rule prediction solution based on the located best matching historical record for carbon emission prediction for the current demand.

In still another aspect of the present invention, there is provided a system for selecting a solution for carbon emission prediction. The system includes: an apparatus for selecting a solution for carbon emission prediction as described above, and a carbon emission database for storing historical records of carbon emission, where each historical record includes a demand description and an actual carbon emission measurement.

With embodiments of the present invention, for any given current demand, it is possible to locate from the historical records of carbon emission a best matching record with respect to the current demand, and further calculate a demand gap between the current demand and the best matching historical record as a best matching demand gap. Moreover, it is possible to calculate a data prediction precision and a rule prediction precision of carbon emission based on existing historical records. In particular, prediction precisions can be functions of the demand gap. Thus, with embodiments of the present invention, it is possible to determine which one of a data prediction solution and a rule prediction solution is more suitable for the current demand, according to relationships between the best matching demand gap and the data prediction precision, the rule prediction precision. In this way, an optimal prediction solution can be selected for carbon emission prediction.

More detailed description will be presented below to embodiments of the present invention by referring to the figures. As described above and discussed below in detail, for a given current demand, it is possible to adaptively select a data prediction solution or a rule prediction solution for performing carbon emission prediction based on historical data and respective precisions of the data prediction solution and rule prediction solution in one embodiment of the present invention.

It should be noted that the term "carbon emission" used here is a general term of all greenhouse gas emission. A "greenhouse gas" is a gas that damages a normal relationship of infrared radiation between the atmosphere and the ground, absorbs infrared radiation emitted by the earth, prevents heat dissipation of the earth and gives rise to perceptible warning on the earth. Primary greenhouse gases in the earth's atmosphere include, without limitation, water vapor ($H_2O$), carbon dioxide ($CO_2$), nitrous oxide ($N_2O$), methane ($CH_4$), ozone ($O_3$), etc.

Reference is first made to FIG. 1, which illustrates a flowchart of a method 100 of selecting a solution for carbon emission prediction according to one embodiment of the present invention. It is to be understood that respective steps of the method 100 can be performed in different orders and/or in parallel. The method 100 can further include additional steps and/or steps that are omitted here. The scope of the present invention is not limited in this regard.

After the step 100 starts, historical records of carbon emission and a current demand for carbon emission are obtained in step S102. As described above, in the context of the disclosure, term "demand" can be used to represent any aspect related to carbon emission, including but not limited to amount of coal used, amount of power used, amount of fuel used, amount of natural gas used, storage area (e.g., warehouse area), moving distance of machine, using events of machine, heating time, lighting time, and so on. According to embodiments of the present invention, the current demand for carbon emission can be received from a user. Alternatively or additionally, the current demand for carbon emission can be obtained from other sources or generated by computation. The scope of the present invention is not limited in this regard.

Further, a historical record of carbon emission can be obtained. According to embodiments of the present invention, there exist historical records of carbon emission, where each record (or entry) can contain a demand with respect to a specific project and an actual carbon emission measurement of the project. As an example, Table 1 shows an exemplary structure of historical records of carbon emission. In the example of Table 1, demands for carbon emission saved in the "demand" field are presented in the form of vectors, where each element of a vector represents, for example, concrete values (whose unit is not shown) in respective specific demand aspects. In particular, if a value in a certain demand aspect is not presented or cannot be obtained for other reason, then NULL is populated in this element. In addition, values of carbon emissions obtained by actual measurement means are saved in the "actual measurement" field, whose unit (not shown) can be ton or any proper measuring unit. It is to be understood that Table 1 is merely exemplary, information in fields can be in any other proper format, and historical records of carbon emission can include different or additional fields.

TABLE 1

Exemplary Structure of Historical Records

| Demand | Actual Measurement |
|---|---|
| (20, 30.5, 1003, 200) | 3.06 |
| (30, NULL, 5202, 105) | 4.51 |
| ... | ... |

It is to be understood that the historical records of carbon emission can be saved in various manners, including but not limited to various tables of databases, structured text compiled in the Extensible Markup Language (XML) for example, binary or text files, etc. It is to be understood that information and data saved in such historical records can be obtained or read by presently known means or means which can be developed in future. The scope of the present invention is not limited in this regard.

Next, the method 100 proceeds to step S104 to locate from the historical records of carbon emission a best matching historical record with respect to the current demand. For a given current demand, the best matching historical record can be located from historical records in various manners. For example, according to some embodiments of the present invention, it is possible to treat a demand as a vector and treat the demand's respective concrete aspects (e.g., amount of coal used, amount of power used, etc.) of the demand as the vector's elements. In this way, a distance between demands can be calculated by calculating a distance (e.g., Euclidean distance) between vectors. A historical record corresponding to a historical demand having the shortest distance from the current demand can be selected as the best matching historical record.

In particular, in some embodiments of the present invention, when calculating a distance between vectors, it is possible to assign corresponding weights to some elements according to actual application and conditions. For example, a project associated with the current demand attaches special attention to the amount of coal used, a weight of the amount of coal used can be increased during the distance calculation.

The above-described locating of the best matching historical record through a distance between vectors is merely exemplary. In fact, those skilled in the art can contemplate other appropriate ways for locating the best matching historical record with respect to the current demand. For example, it is possible to perform a quantitative operation on or make a qualitative comparison (e.g., comparison with a given threshold) of respective indices in the demand. Alternatively, the best matching historical record can be manually specified. The scope of the present invention is not limited in this regard.

Subsequently in step S106, based on the best matching historical record located in step S104, a data prediction solution or a rule prediction solution is selected for carbon emission prediction with respect to the current demand. Step S106 can be performed in various manners. For example, in some embodiments, it is possible to determine respective precisions of a data prediction solution and a rule prediction solution with respect to the demand of the best matching historical record. Specifically, it is possible to respectively apply a data prediction solution and a rule prediction solution to the demand of the best matching historical record located in step S104, so as to obtain a data prediction result and a rule prediction result. Then, a data prediction precision and a rule prediction precision (e.g., in the form of a percentage) can be obtained by comparing the data prediction result and the rule prediction result with the actual carbon emission measurement stored in the historical record, respectively.

It is to be understood that such data prediction precision and rule prediction precision can be dynamically calculated in runtime, or calculated and stored in advance. In any event, for each historical record of carbon emission, when a corresponding actual carbon emission measurement corresponding is obtained, a data prediction precision and a rule prediction precision can be calculated as described above. Then, the calculated data prediction precision and rule prediction precision can be stored separately, for example, in a data prediction knowledge repository and a rule prediction knowledge repository (to be described below in detail), respectively. Like the historical records of carbon emission, the data prediction knowledge repository and rule prediction knowledge repository can be implemented in various manners as described above. Further, according to embodiments of the present invention, the historical records, data prediction knowledge repository, and rule prediction knowledge repository can be implemented either separately or in conjunction with one another. The scope of the present invention is not limited in these regards.

It is further to be understood that according to embodiments of the present invention, there can exist various data prediction solutions and/or rule prediction solutions which are presently known or will be developed in future. It is possible to select a solution with the highest prediction precision from a plurality of data/rule prediction solutions. Other selection polices are possible as well. For example, in some other embodiments, the selection of a concrete data/rule prediction solution can depend on specific needs and application or be specified manually. The scope of the present invention is not limited in this regard.

The method 100 ends after step S106. By the method 100, it is possible to find a historical record having the smallest gap with the current demand, namely the best matching historical record. Further, it is possible to select one of a data prediction solution and a rule prediction solution based on their prediction precisions with respect to the best matching historical record for carbon emission prediction for the current demand.

Figure 2:
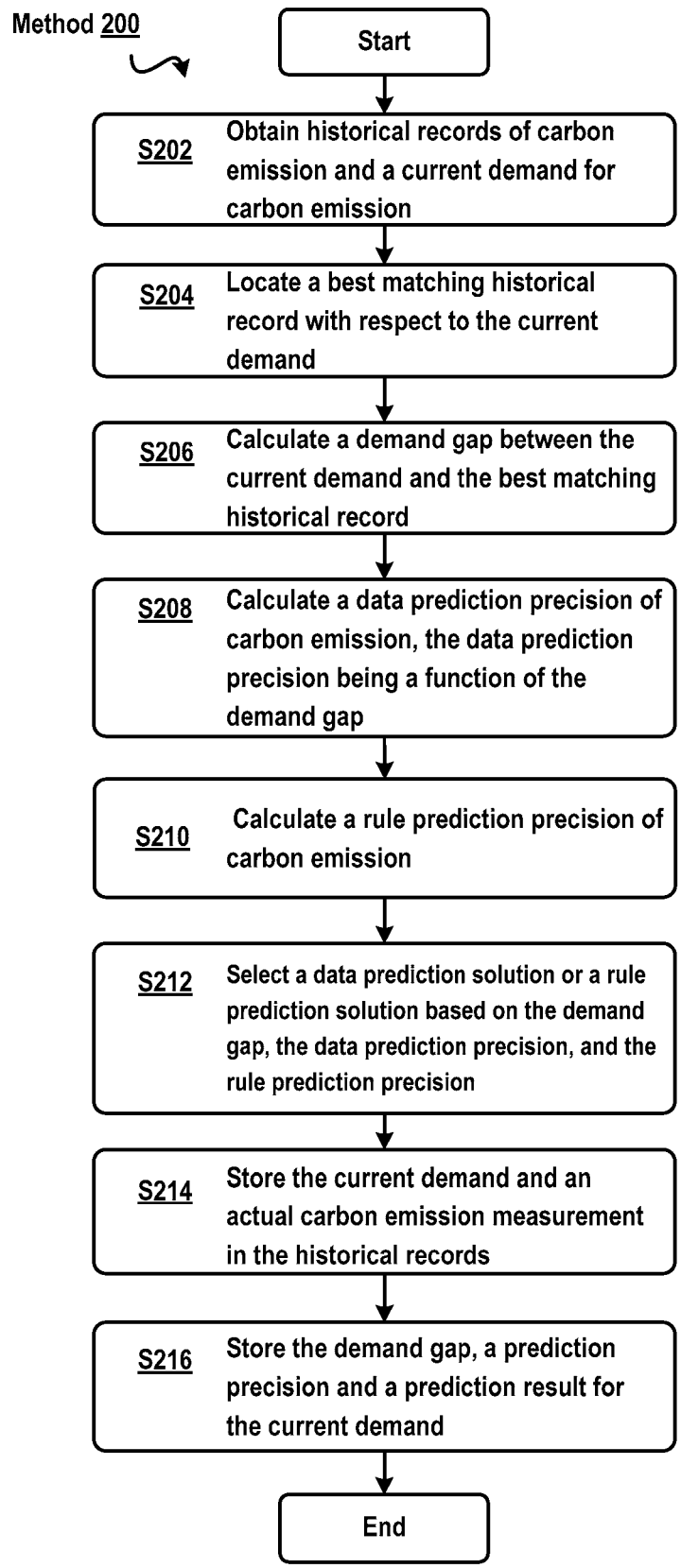
FIG. 2 illustrates a flowchart of a method 200 for selecting a solution for carbon emission prediction according to another embodiment of the present invention.

Reference is now made to FIG. 2, which illustrates a flowchart of a method 200 of selecting a solution for carbon emission prediction according to another embodiment of the present invention. The method 200 can be implemented as a preferred embodiment of the method 100 described above with reference to FIG. 1. It will be apparent from the following description that according to the method 200, after the best matching historical record with respect to the current demand is located, a quantized demand gap therebetween can be calculated and a data prediction precision and a rule prediction precision are treated as functions of the demand gap. In this way, an optimal solution for carbon emission prediction can be selected by quantizing the demand gap.

After the method 200 starts, historical records and a current demand for carbon emission are obtained in step S202; the best matching historical record with respect to the current demand is located from the historical records of carbon emission in step S204. Steps S202 and S204 correspond to steps S102 and S104 described with reference to FIG. 1, respectively, and thus are not detailed here.

Next, the method 200 proceeds to step S206 where a demand gap between the best matching historical record located in step S204 and the current demand is calculated. As described above with reference to step S104 of the method 100, the demand gap can be calculated in various manners. In a preferred embodiment of the present invention, for example, the demand gap can be calculated by using a vector distance. Of course, other embodiments are also feasible.

It is to be understood that as described above, the best matching historical record can be determined by calculating a demand gap between the current demand and each historical record in step S204. At this point, the operation of step S206 has been actually accomplished in step S204. In this case, after the demand gap is calculated and used for locating the best matching historical record, it is no more discarded but recorded and retained for subsequent use (which differs from the method 100).

The method 200 then proceeds to step S208 where a data prediction precision of carbon emission is calculated, the data prediction precision being a function of the demand gap. According to embodiments of the present invention, the calculation of the data prediction precision can be based on the above-mentioned data prediction knowledge repository. According to embodiments of the present invention, each entry in the data prediction knowledge repository corresponds to one entry in the historical records of carbon emission, and can include a "data prediction result" field and a "best matching demand gap" field.

For any given entry in the data prediction knowledge repository, the "data prediction result" field can store a result of carbon emission prediction obtained by the data prediction solution, and the "best matching demand gap" field can store a demand gap (i.e., best matching demand gap) between a demand corresponding to the entry and the best matching historical record among the historical records of carbon emission. Here, the "best matching historical record" and "best matching demand gap" can be determined in a similar manner as described above with reference to step S204 and S206.

Further, the entry in the data prediction knowledge repository can include a "data prediction precision" field. As described above, such kind of data prediction precision can be calculated and stored when an actual carbon emission measurement can be obtained. It is to be understood that the "data prediction precision" field is optional. In fact, when a data prediction precision is needed, it can be calculated in real time according to an actual measurement stored in the historical record and a value stored in the "data prediction result" field. Table 2 shows an exemplary structure of the data prediction knowledge repository. It should be noted that in the example shown in Table 2, the "best matching demand gap" field saves a value of a Euclidean distance between two demand vectors. However, this is merely exemplary. The best matching demand gap can have other proper formats, depending on concrete application and calculation method.

TABLE 2

Exemplary Structure of Data Prediction Knowledge Repository

| Data Prediction Result | Best Matching Demand Gap | Data Prediction Precision (Optional) |
|---|---|---|
| 25.30 | 3.00 | 89% |
| 1003.74 | 1.72 | 73% |
| ... | ... | ... |

In step S208, based on one or more entries in the data prediction knowledge repository, a data prediction precision can be calculated as a function of the demand gap in various ways. As an example, reference is made to FIG. 3A, which illustrates a schematic view of a prediction precision being a function of the demand gap according to some embodiments of the present invention. In the embodiment illustrated in FIG. 3A, the horizontal axis represents gaps between demands, and the longitudinal axis represents prediction precisions. Since each entry in the knowledge repository stores the best matching demand gap and a data prediction precision (or a data prediction precision can be calculated), each entry in the knowledge repository can corresponds to a point in the coordinate plane.

Figure 3A:
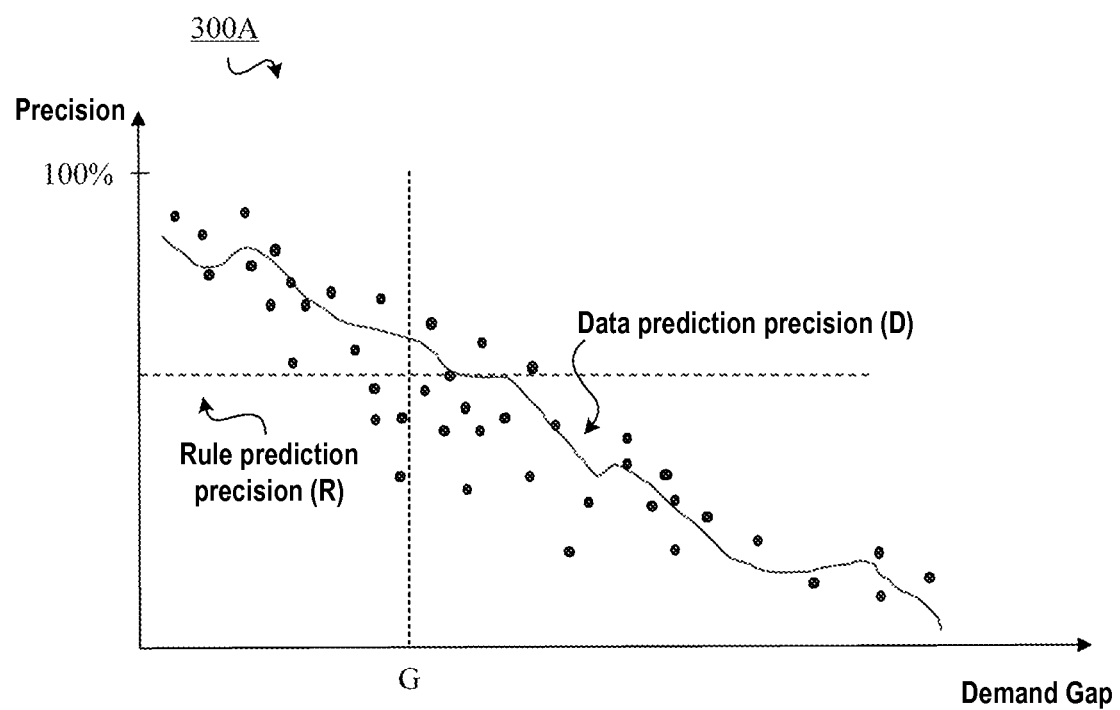
FIG. 3A illustrates a schematic view of a prediction precision that is a function of a demand gap according to embodiments of the present invention.

Thus in the embodiment illustrated in FIG. 3A, one or more points in the coordinate plane can be obtained. By fitting these points, the resulting curve can be used as a data prediction precision D. It is to be understood that any curve fitting method or algorithm that is presently known or will be developed in future can be used in the embodiment of the present invention, so as to generate the data prediction precision D; the scope of the present invention is not limited in this regard. Obviously the data prediction precision D is a function of the demand gap in the embodiment illustrated in FIG. 3A.

The method 200 subsequently proceeds to step S210 where a rule prediction precision of carbon emission is calculated. According to embodiments of the present invention, the calculation of the rule prediction precision can be based on a rule prediction knowledge repository. Each entry in the rule knowledge repository can include "rule prediction result" field for storing a result of carbon emission prediction obtained by the rule prediction solution. Further, the entry in the rule prediction knowledge repository can include a "rule prediction precision" field. As described above, such kind of rule prediction precision can be calculated and stored when an actual carbon emission measurement can be obtained. It is to be understood that the "rule prediction precision" field is also optional, just like the "data prediction precision" field in the data prediction knowledge repository.

TABLE 3

Exemplary Structure of Rule Prediction Knowledge Repository

| Rule Prediction Result | Rule Prediction Precision (Optinoal) |
|---|---|
| 25.72 | 92% |
| 987.59 | 83% |
| ... | ... |

It should be noted that according to some embodiments of the present invention, the entry in the rule prediction knowledge repository can exclude the "best matching demand gap" field, which is determined by inherent characteristics of the rule prediction solution. Specifically, the rule prediction solution can determine or learn the relationship between an inputted demand and carbon emission primarily based on relevant demand and empirical rule. Therefore the rule prediction precision does not vary with the change of demand gap as significantly as the data prediction precision. The "best matching demand gap" field can thus be omitted in the rule prediction knowledge repository. Of course, this is not limiting, and those skilled in the art can understand that the entry in the rule prediction knowledge repository can also have the "best matching demand gap" field.

In step S210, based on one or more entries in the rule prediction knowledge repository, a rule prediction precision can be calculated in various ways. For example, a rule prediction precision R can be the average, weighted average, or maximum of all prediction precisions in the rule prediction knowledge repository. Other manners for calculating the rule precision R are also feasible, and the scope of the present invention is not limited in this regard. Still referring to the embodiment illustrated in FIG. 3A, it can be seen that in this example the rule prediction precision R can be understood as a constant function of the demand gap. In other words, the rule prediction precision R does not vary with the change of demand gap in this example.

As described above, the rule prediction precision R does not vary with the change of demand gap as significantly as the data prediction precision. Hence, calculating the rule prediction precision R as a constant function of the demand gap is sufficient for the object of the present invention. However, this is not limiting, and those skilled in the art can understand that just like the data prediction precision D, the rule prediction precision R can also be calculated as a non-constant function of the demand gap.

The method 200 then proceeds to step S212 where a data prediction solution or a rule prediction solution is selected based on the best matching demand gap, data prediction precision, and rule prediction precision determined in step S206, S208, and S210, respectively. Specifically, it can be determined in step S212 which one of the data prediction precision and the rule prediction precision is higher at the best matching demand gap associated with the current demand.

Refer to FIG. 3A again. In this example, suppose the best matching demand gap associated with the current demand is G. At this point, determination as to which one of the data prediction precision solution and the rule prediction precision solution is higher is made based on the intersection of a straight line, which is perpendicular to the horizontal axis and corresponding to the best matching demand gap G, with the data prediction precision D and the rule prediction precision R. Then, a prediction solution having a higher prediction precision at the best matching demand gap G is selected for carbon emission prediction with respect to the current demand.

It is to be understood that although steps S208 to S212 of the method 200 have been described with reference to FIG. 3A, this is merely exemplary. In fact, these steps of the method 200 can be put into practice in any other proper manner. By way of example, referring to FIG. 3B, a schematic view of a prediction precision as a function of the demand gap according to some embodiments of the present invention is illustrated. Like FIG. 3A, in the embodiment illustrated in FIG. 3B, the horizontal axis represents gaps between demands, and the longitudinal axis represents data prediction precisions and rule prediction precisions.

Figure 3B:
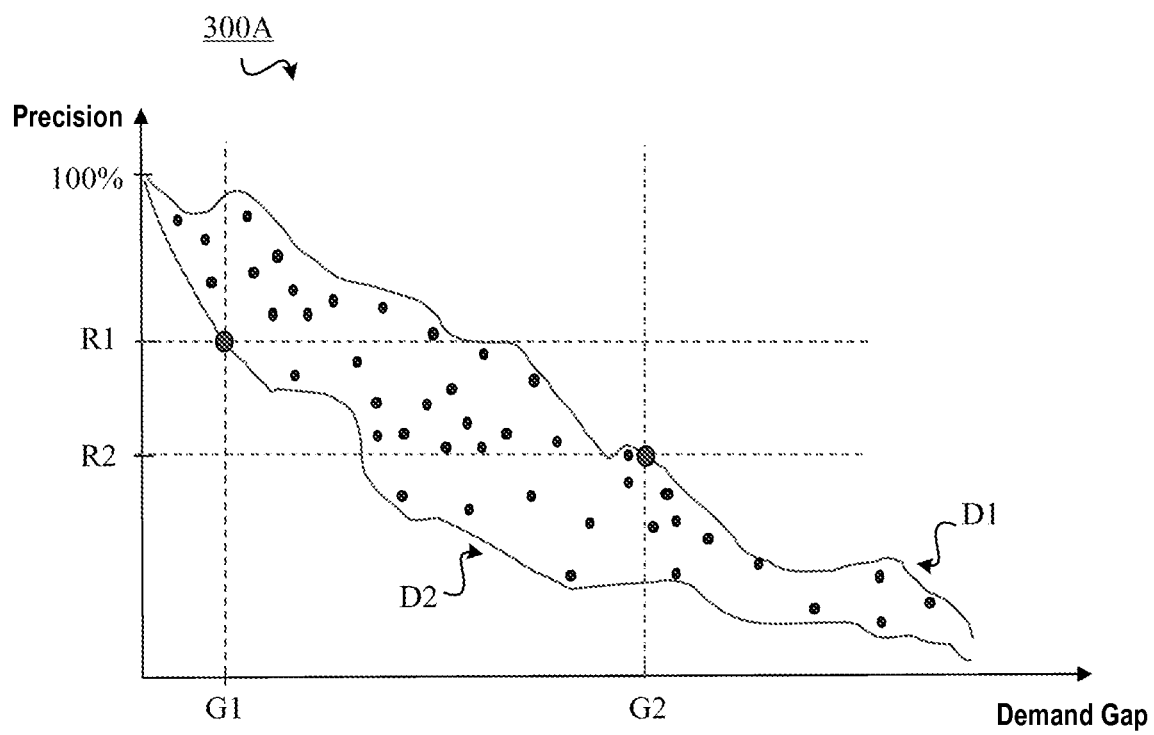
FIG. 3B illustrates a schematic view of a prediction precision that is a function of a demand gap according to embodiments of the present invention.

Unlike FIG. 3A, in the embodiment illustrated in FIG. 3B, the determining a data prediction precision in step S208 includes determining an upper limit and a lower limit of the data prediction precision, so as to make a more accurate comparison between a data prediction precision and a rule prediction precision. In other words, unlike curve-fitting respective points to obtain a single data prediction precision in FIG. 3A, points distributed in the coordinate plane are considered as a plane point set in the example of FIG. 3B. Then, a plane bounding box of the point set is calculated to obtain an upper limit and a lower limit of the point set, namely the upper limit D1 and the lower limit D2 of the data prediction precision. Obviously, the upper and lower limits of the data prediction precision determined in this way are also functions of the demand gap.

Further, in the embodiment illustrated in FIG. 3B, determining a rule prediction precision in step S210 includes determining an upper limit and a lower limit of the rule prediction precision. For example, based on the entry in the rule prediction knowledge repository, the highest precision and the lowest precision of rule prediction can be determined, and they are considered as an upper limit R1 and a lower limit R2 of the rule prediction precision, respectively. Like FIG. 3A, the upper limit R1 and the lower limit R2 of the rule prediction precision are constant functions of the demand gap.

In the embodiment illustrated in FIG. 3B, the selecting a data prediction solution or a rule prediction solution in step S212 can be implemented by the following sub-steps. First of all, a first demand gap G1 is determined which corresponds to the case that the lower limit D2 of the rule prediction precision is equal to the upper limit R1 of the rule prediction precision. This can be done by projecting the intersection point of D2 and R1 to the horizontal axis. Next, a second demand gap G2 is similarly calculated which corresponds to the case that the upper limit D1 of the data prediction precision is equal to the lower limit R2 of the rule prediction precision. Finally, the data prediction or rule prediction can be selected based on a relationship among the best matching demand gap G with the current user demand as determined in step S206, the first demand gap G1, and the second demand gap G2.

In particular, according to some embodiments of the present invention, responsive to the best matching demand gap G being less than the first demand gap G1, a data prediction solution is selected for the current demand, because historical records indicate that in this case the upper limit of the rule prediction precision is still less than the lower limit of the data prediction precision. Similarly, responsive to the best matching demand gap G being larger than the first demand gap G1, a rule prediction solution is selected for the current demand, because historical records indicate that in this case the upper limit of the data prediction precision is still less than the lower limit of the rule prediction precision.

Responsive to the best matching demand gap G falling between G1 and G2, according to some embodiment of the present invention, a data prediction solution or a rule prediction solution can be selected according to the actual carbon emission measurement, the rule prediction result, and the data prediction result with respect to the best matching historical record (located in step S204). For example, the selection can be made by comparing which one of the data prediction result and the rule prediction result is more approximate to the actual carbon emission measurement. In other words, with respect to the best matching historical record, if the difference between the data prediction result and the actual carbon emission measurement is less than the difference between the rule prediction result and the actual carbon emission measurement, then a data prediction solution is selected for carbon emission prediction with respect to the current demand; otherwise, a rule prediction solution is selected. It is to be understood that this is merely exemplary, any other proper selection mechanisms are feasible, and the scope of the present invention is not limited in this regard.

It is to be understood that what has been described above with reference to FIGS. 3A and 3B is merely examples of selecting a data prediction solution or a rule prediction solution according to a demand gap, a data prediction precision, and a rule prediction precision, and is not intended to limit the scope of the present invention. Based on the teaching and suggestion offered here, those skilled in the art can readily contemplate other methods of making selection based on these factors.

Returning to FIG. 2, the method proceeds to step S214 where the current demand and an actual carbon emission measurement for the current demand are stored in the historical records. Step S214 is optional, with a purpose of using information related to the current demand to further fill and perfect the historical records and thus providing a more reliable prediction basis for a subsequent demand. This is essentially a learning procedure of historical records. It is to be understood that the actual carbon emission measurement for the current demand is usually obtained after the project is put into practice. Accordingly, in step S214 first information related to the current demand can be populated to the records, and subsequently an actual measurement is populated when it is available.

Then the method 200 proceeds to step S216 to store the best matching demand gap determined in step S206, the prediction result and the prediction precision for the current demand. It is to be understood that based on a data prediction solution or a rule prediction solution being selected in step S212, corresponding information will stored in step S216 at different locations. Specifically, when a data prediction solution is selected in step S212, the best matching demand gap, the prediction result and the prediction precision obtained by data prediction can be stored, for example, in the above-described data prediction knowledge repository in step S216. Similarly, when a rule prediction solution is selected in step S212, the relevant information can be stored in the rule prediction knowledge repository.

It is to be understood that like step S214, step S216 is optional, which serves a purpose of using information related to the current demand to further fill and perfect the data prediction knowledge repository or the rule prediction knowledge repository and thus achieving a learning procedure. Furthermore, it is to be understood that in step S214 the prediction precision is calculated and stored after the actual carbon emission measurement is available.

The method 200 ends after step S216. According to the method 200, the relationships between the data prediction precision, the rule prediction precision and the demand gap are brought to full use, thereby making it possible to select an optimal prediction solution for the current demand based on historical records.

Figure 4:
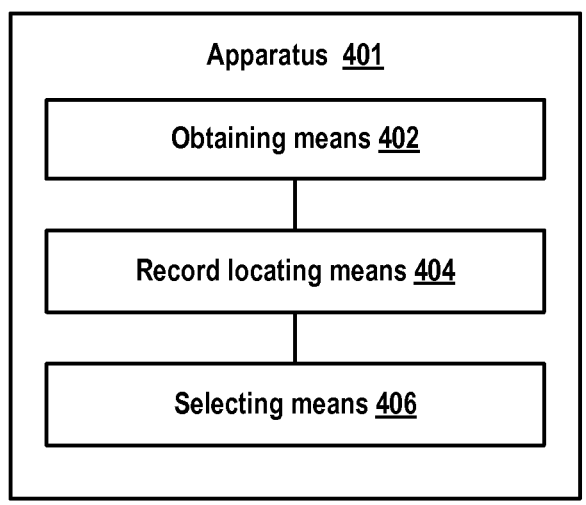
FIG. 4 illustrates a block diagram of an apparatus 401 for selecting a solution for carbon emission prediction according to one embodiment of the present invention.

Referring to FIG. 4, a block diagram of an apparatus 401 for selecting a solution for carbon emission prediction according to one embodiment of the present invention is illustrated. As illustrated in FIG. 4, According to embodiments of the present invention, the apparatus 401 can include: obtaining means 402 configured to obtain historical records of carbon emission and a current demand for carbon emission; record locating means 404 configured to locate from the historical records of carbon emission a best matching historical record with respect to the current demand; and selecting means 406 configured to select one of a data prediction solution and a rule prediction solution based on the located best matching historical record for carbon emission prediction for the current demand.

Figure 5:
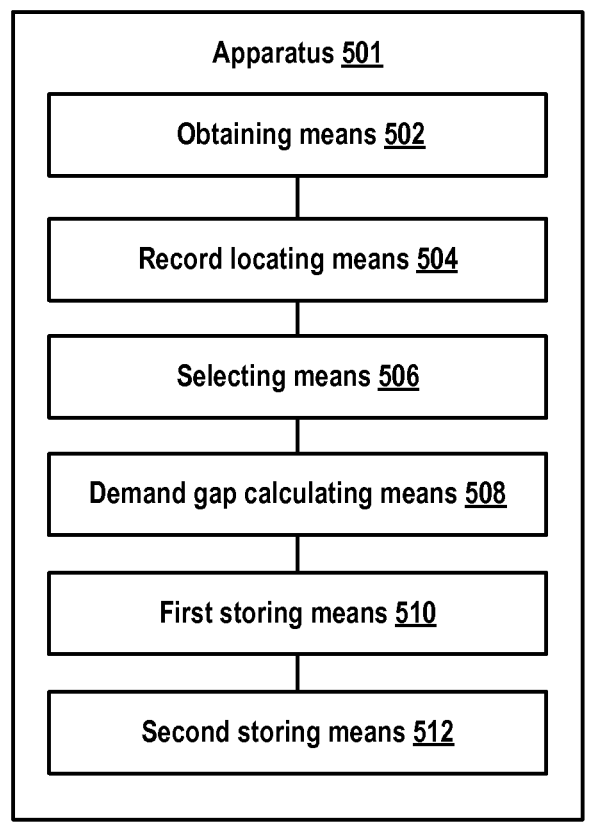
FIG. 5 illustrates a block diagram of an apparatus 501 for selecting a solution for carbon emission prediction according to another embodiment of the present invention.

Further referring to FIG. 5, a block diagram of an apparatus 501 for selecting a solution for carbon emission prediction according to a preferred embodiment of the present invention is illustrated. The apparatus 501 illustrated in FIG. 5 can be implemented as a preferred embodiment of the apparatus 401 described above with reference to FIG. 4. As illustrated in FIG. 5, According to embodiments of the present invention, the apparatus 501 can include: obtaining means 502, record locating means 504, and selecting means 506, which correspond to the obtaining means 402, the record locating means 404, and the selecting means 404 described with reference to FIG. 4, respectively, and therefore are not detailed here.

According to some embodiments of the present invention, the apparatus 501 can further include demand gap calculating means 508 configured to calculate a demand gap between the current demand and the best matching historical record as a best matching demand gap. At this point, the selecting means 506 can further include (not shown in the figure): data prediction precision determining means configured to determine a data prediction precision as a function of the demand gap; a rule prediction precision determining means configured to determine a rule prediction precision, and first selecting means configured to select one of a data prediction solution and a rule prediction solution according to the best matching demand gap, the data prediction precision, and the rule prediction precision.

In particular, according to some embodiments of the present invention, the data prediction precision determining means can further include means configured to determine an upper limit and a lower limit of the data prediction precision, and the rule prediction precision determining means can further include means configured to determine an upper limit and a lower limit of the rule prediction precision. In such embodiments, the first selecting means further includes: first demand gap determining means configured to determine a first demand gap corresponding to the case that the lower limit of the data prediction precision is equal to the upper limit of the rule prediction precision, second demand gap determining means configured to determine a second demand gap corresponding to the case that the upper limit of the data prediction precision is equal to the lower limit of the rule prediction precision, and second selecting means configured to select one of a data prediction solution and a rule prediction solution based on the best matching demand gap, the first demand gap, and the second demand gap.

According to some embodiments of the present invention, the second selecting means further includes: means configured to select a data prediction solution responsive to the best matching demand gap being less than the first demand gap, means configured to select a rule prediction solution responsive to the best matching demand gap being larger than the second demand gap, and/or means configured to select, responsive to the best matching demand gap falling between the first demand gap and the second demand gap, one of a data prediction solution and a rule prediction solution based on an actual carbon emission measurement, a rule prediction result, and a data prediction result associated with the best matching historical record.

In addition, according to some embodiments of the present invention, the apparatus 501 can further include first storing means 510 configured to store in the historical records the current demand and an actual carbon emission measurement for the current demand. The apparatus 501 can further include second storing means 512 configured to store the best matching demand gap, a prediction result and a prediction precision for the demand.

It is to be understood that all means and sub-means in the apparatus 401 and the apparatus 501 described above with reference to FIGS. 4 and 5 correspond to respective steps of the method 100 and the method 200 described with reference to FIGS. 1 and 2, respectively. Hence, all above-described features and operations of the method 100 and the method 200 are also suitable for the apparatus 401 and the apparatus 501, which are not detailed here.

It is further to be understood that the apparatus 401 and the apparatus 501 can be implemented in various manners, including software, hardware, firmware, or an arbitrary combination thereof. For example, in some embodiments, the apparatus 401 and the apparatus 501 can be implemented using software and/or firmware modules. Alternatively or additionally, the apparatus 401 and the apparatus 501 each can be implemented using hardware modules. For example, the apparatus 401 and the apparatus 501 each can be implemented as an Integrated Circuit (IC) chip or an Application-Specific Integrated Circuit (ASIC). Also, apparatus 401 and the apparatus 501 each can be implemented as a System On-Chip (SOC). Other manners, whether currently known or developed in future, are possible as well. The scope of the present invention is not limited in this regard.

Figure 6:
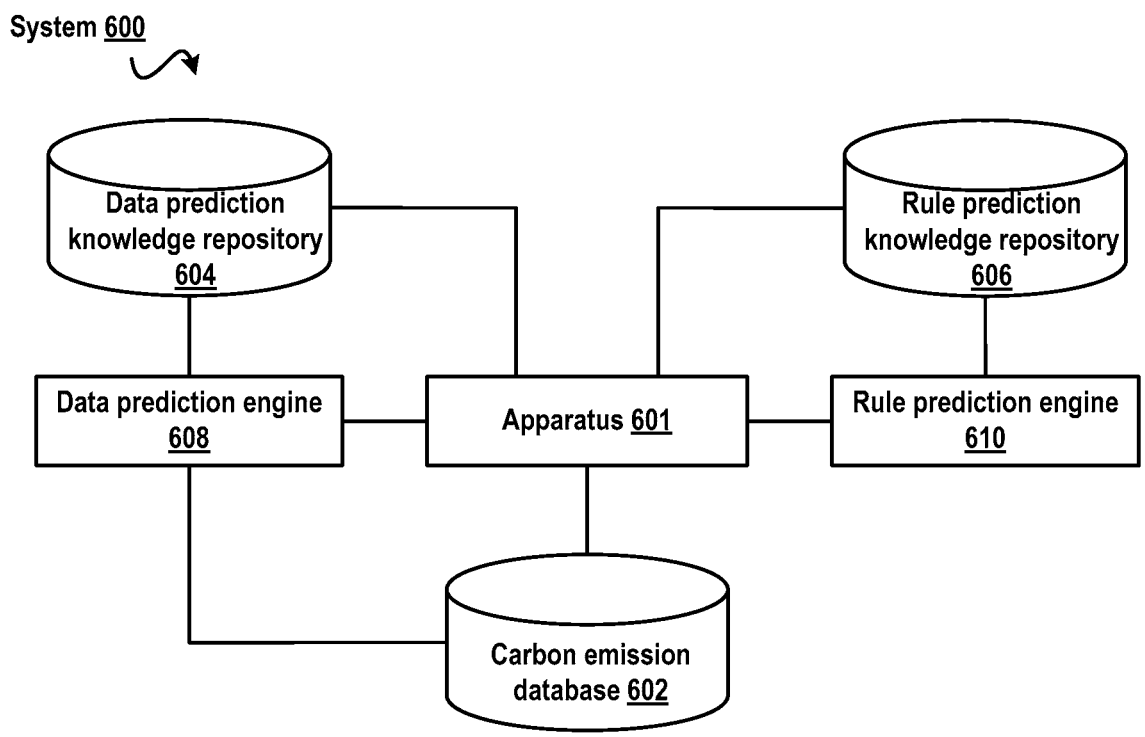
FIG. 6 illustrates a block diagram of a system 600 for selecting a solution for carbon emission prediction According to embodiments of the present invention.

Referring to FIG. 6, a block diagram of a system 600 for selecting a solution for carbon emission prediction according to one embodiment of the present invention is illustrated. As shown in FIG. 6, According to embodiments of the present invention, the system 600 includes: an apparatus 601 for selecting a solution for carbon emission prediction, which corresponds to the apparatus 401 described with reference to FIG. 4 or the apparatus 501 described with reference to FIG. 5 in terms of structure and function, and a carbon emission database 602 for storing historical records of carbon emission, where each historical record includes a demand description and an actual carbon emission measurement.

According to some embodiments of the present invention, the system can further include: a data prediction knowledge repository 604 configured to store a prediction result obtained by a data prediction solution, a demand gap with the best matching historical record stored in the carbon emission database, and a data prediction precision, and a rule prediction knowledge repository 606 configured to store a prediction result obtained by a rule prediction solution and a rule prediction precision.

According to some embodiments of the present invention, the system 600 can further include: a data prediction engine 608 configured to perform carbon emission prediction for the current demand by using a data prediction solution that is selected by the apparatus for selecting a solution for carbon emission prediction, and a rule prediction engine 610 configured to perform carbon emission prediction for the current demand by using a rule prediction solution that is selected by the apparatus for selecting a solution for carbon emission prediction.

Figure 7:
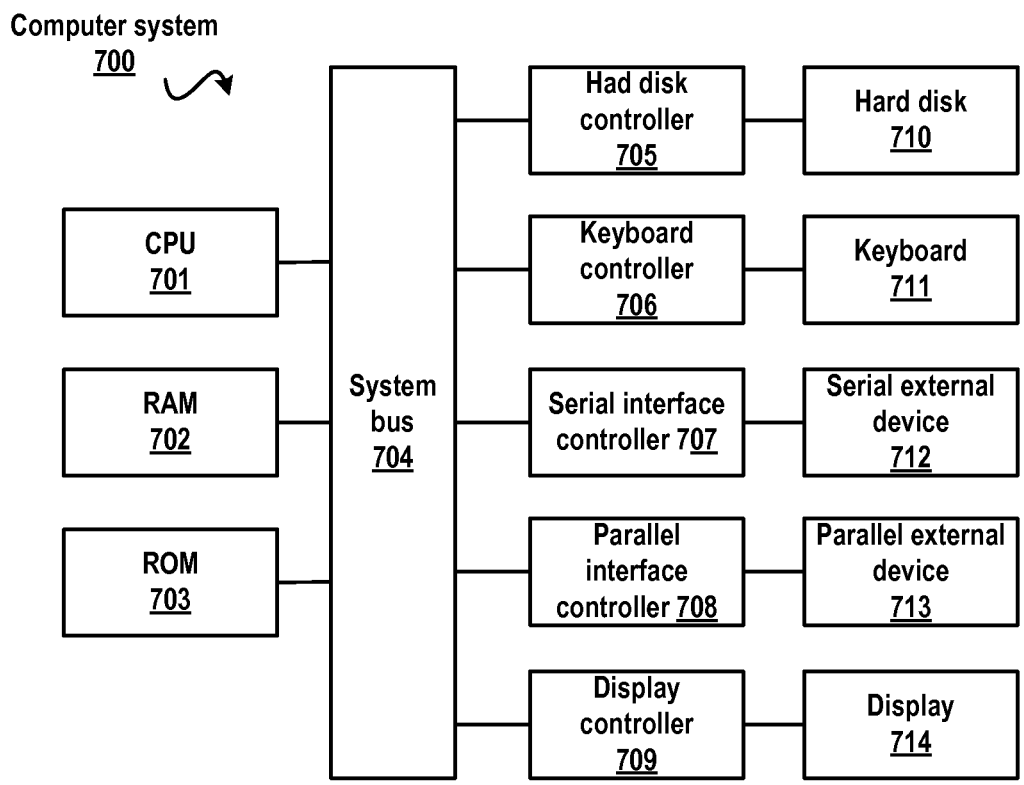
FIG. 7 illustrates a structural block diagram of an exemplary computer system 700 in which embodiments of the present invention can be implemented.

FIG. 7 schematically illustrates a structural block diagram of an exemplary computer system 700 in which embodiments according to the present invention can be implemented. As illustrated, the computer system 700 can include: a CPU (central processing unit) 701, RAM (random access memory) 702, ROM (read only memory) 703, a system bus 704, a hard disk controller 705, a keyboard controller 706, a serial interface controller 707, a parallel interface controller 708, a display controller 709, a hard disk 710, a keyboard 711, a serial external device 712, a parallel external device 713 and a display 714.

Among these components, the CPU 701, the RAM 702, the ROM 703, the hard disk controller 705, the keyboard controller 706, the serial interface controller 707, the parallel interface controller 708, and the display controller 709 are connected to the system bus 704, the hard disk 710 is connected to the hard disk controller 705, the keyboard 711 is connected to the keyboard controller 706, the serial external device 712 is connected to the serial interface controller 707, the parallel external device 713 is connected to the serial interface controller 708, and the display 714 is connected to the display controller 709. It is to be understood that the structural block diagram illustrated in FIG. 7 is merely illustrative rather than limiting the scope of the present invention. Some devices can be added or omitted according to circumstances.

Particularly, in addition to a hardware implementation, embodiments of the present invention can be implemented as a computer program product. For example, both the method 100 described with reference to FIG. 1 and the method 200 described with reference to FIG. 2 can be implemented as a computer program product. The computer program product can be stored in the RAM 702, the ROM 703, the hard disk 710 as illustrated in FIG. 7 and/or any proper memory medium, or be downloaded to the computer system 700 from a proper location via a network.

The computer program product can include a computer code portion, which includes program instructions executable by a proper processing apparatus (e.g., the CPU 701 illustrated in FIG. 7). The program instructions can at least include: program instructions for obtaining historical records of carbon emission and a current demand for carbon emission, program instructions for locating from the historical records a best matching historical record with respect to the current demand, and program instructions for selecting one of a data prediction solution and a rule prediction solution based on the located best matching historical record for carbon emission prediction for the current demand.

The ideas and principles of the present invention have been explained by means of several embodiments of the present invention. As is clear from the foregoing description, it is possible to adaptively select a data prediction solution or a rule prediction solution for carbon emission prediction for a given demand, based on a demand gap between the demand and a historical record.

It should be noted that each block in the foregoing flowcharts or block diagrams can represent a module, a program segment, or a part of code, which contains one or more executable instructions for performing specified logic functions. It should further be noted that in some alternative implementations, functions indicated in blocks can occur in an order differing from the order as shown in the figures. For example, two blocks shown consecutively can be performed in parallel substantially or in an inverse order sometimes, which depends on the functions involved. In addition, it should be noted that each block and a combination of blocks in the block diagrams or flowcharts can be implemented by a dedicated, hardware-based system for performing specified functions or operations or by a combination of dedicated hardware and computer instructions.

The methods and apparatuses according to embodiments of the present invention can be implemented in full hardware, full software, or combination of hardware components and software components. In a preferred embodiment, the present invention is implemented as software, including, without limitation to, firmware, resident software, micro-code, etc.

Moreover, the present invention can be implemented as a computer program product used by computers or accessible by computer-readable media that provide program code for use by or in connection with a computer or any instruction executing system. For the purpose of description, a computer-usable or computer-readable medium can be any tangible means that can contain, store, communicate, propagate, or transport the program for use by or in connection with an instruction execution system, apparatus, or device.

The medium can be an electric, magnetic, optional, electromagnetic, infrared, or semiconductor system (apparatus or device), or propagation medium. Examples of the computer-readable medium can include the following: a semiconductor or solid memory device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing and/or executing program code can include at least one processor that is coupled to a memory element directly or via a system bus. The memory element can include a local memory usable during actually executing the program code, a mass memory, and a cache that provides temporary memory for at least one portion of program code so as to decrease the number of times for retrieving code from the mass memory during execution.

An Input/Output or I/O device (including, without limitation to, a keyboard, a display, a pointing device, etc.) can be coupled to the system directly or via an intermediate I/O controller.

A network adapter can also be coupled to the system such that the data processing system can be coupled to other data processing systems, remote printers or memory devices via an intermediate private or public network. A modem, a cable modem, and an Ethernet card are merely examples of a currently available network adapter.

Although several embodiments of the present invention have been described above, those skilled in the art can appreciate that the description is merely illustrative and exemplary. Under the teaching of this specification, various modifications and alterations can be made to embodiments of the present invention without departing from the true spirit of the present invention. Therefore, features disclosed in the specification should not be deemed as limiting. The scope of the present invention is defined by the appended claims only.

What is claimed is:

1. A computer-implemented method for selecting a solution for carbon emission prediction comprising the steps of:
   obtaining historical records of carbon emission and a current demand for carbon emission;
   locating from the historical records of carbon emission a best matching historical record with respect to the current demand;
   selecting, based on the located best matching historical record, one of: (i) a data prediction solution record and (ii) a rule prediction solution; and
   calculating a demand a between the current demand and the best matching historical record as a best matching demand gap;
   wherein at least one step is carried out using a computer device.

2. The method according to claim 1,
   wherein the selecting step further comprises the steps of:
      determining a data prediction precision as a function of the demand gap;
      determining a rule prediction precision; and
      selecting one of: (i) a data prediction solution and (ii) a rule prediction solution according to the best matching demand gap, the data prediction precision, and the rule prediction precision.

3. The method according to claim 2, wherein the determining a data prediction step further comprises the step of: determining an upper limit and a lower limit of the data prediction precision, wherein the determining a rule prediction precision step further comprises the step of:
   determining an upper limit and a lower limit of the rule prediction precision, and wherein the selecting according to the best matching demand gap, the data prediction precision, and the rule prediction precision step further comprises the steps of:
   determining a first demand gap corresponding to a case that the lower limit of the data prediction precision is equal to the upper limit of the rule prediction precision;
   determining a second demand gap corresponding to a case that the upper limit of the data prediction precision is equal to the lower limit of the rule prediction precision; and
   selecting, based on the best matching demand gap, the first demand gap, and the second demand gap, one of: (i) a data prediction solution and (ii) a rule prediction solution.

4. The method according to claim 3, wherein the selecting, based on the best matching demand gap, the first demand gap, and the second demand gap step further comprises the step of:
   selecting a data prediction solution responsive to the best matching demand gap that is less than the first demand gap.

5. The method according to claim 3, wherein the selecting, based on the best matching demand gap, the first demand gap, and the second demand gap step further comprises the step of:
   selecting a rule prediction solution responsive to the best matching demand gap that is larger than the second demand gap.

6. The method according to claim 3, wherein the selecting, based on the best matching demand gap, the first demand gap, and the second demand gap step further comprises the step of:
   selecting, based on an actual carbon emission measurement, a rule prediction result, and a data prediction result associated with the best matching historical record, and in response to the best matching demand gap falling between the first demand gap and the second demand gap, one of: (i) a data prediction solution and (ii) a rule prediction solution.

7. The method according to claim 1 further comprising the step of:
   storing, in the historical records, the (i) current demand and (ii) an actual carbon emission measurement for the current demand.

8. The method according to claim 1, further comprising the step of: storing the best matching demand gap, a prediction result and a prediction precision for the demand.

9. A non-transitory article of manufacture tangibly embodying computer readable instructions which, when implemented, cause a computer device to carry out the steps of a method comprising:
- obtaining historical records of carbon emission and a current demand for carbon emission;
- locating from the historical records of carbon emission a best matching historical record with respect to the current demand;
- selecting, based on the located best matching historical record, one of: (i) a data prediction solution record and (ii) a rule prediction solution; and
- calculating a demand gap between the current demand and the best matching historical record as a best matching demand gap.

* * * * *